June 23, 1953 — O. E. SZEKELY — 2,642,970
LATCH RELEASED POSITIVE CLUTCH
Filed Feb. 23, 1950 — 4 Sheets-Sheet 1
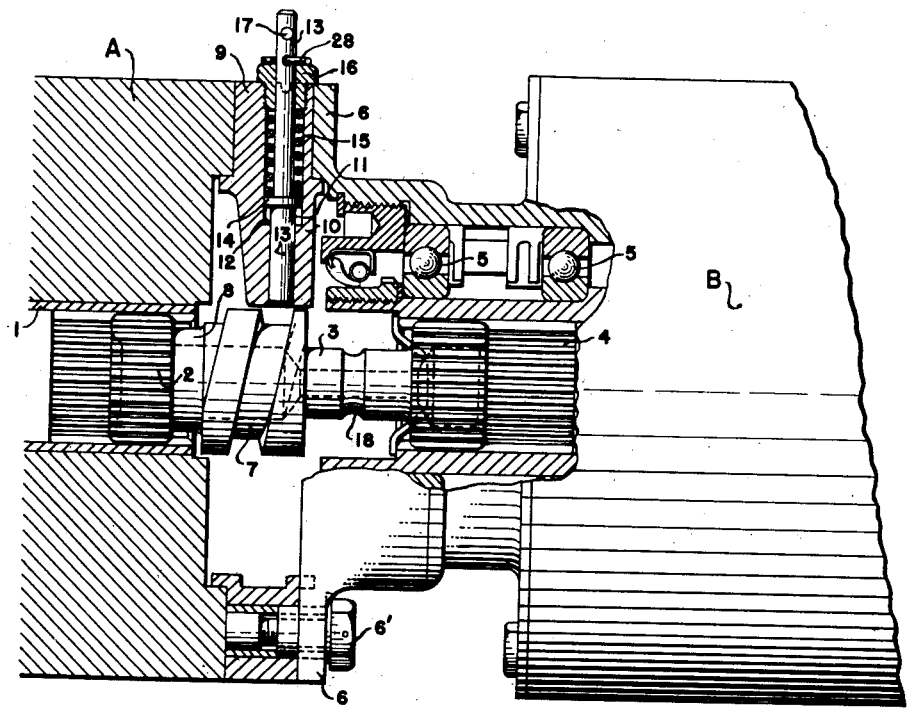
FIG. 1.
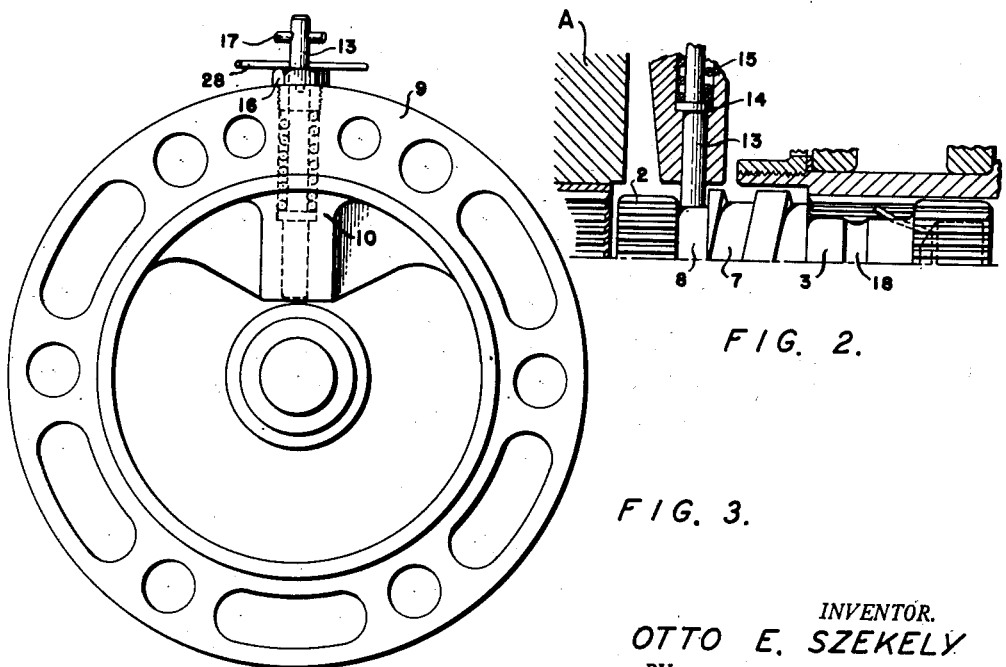
FIG. 2.
FIG. 3.
INVENTOR.
OTTO E. SZEKELY
BY
ATTORNEYS.

June 23, 1953  O. E. SZEKELY  2,642,970
LATCH RELEASED POSITIVE CLUTCH

Filed Feb. 23, 1950  4 Sheets—Sheet 2

INVENTOR.
OTTO E. SZEKELY
BY
ATTORNEYS.

INVENTOR.
OTTO E. SZEKELY
BY
ATTORNEYS.

INVENTOR.
OTTO E. SZEKELY

Patented June 23, 1953

2,642,970

UNITED STATES PATENT OFFICE 2,642,970

LATCH RELEASED POSITIVE CLUTCH

Otto E. Szekely, Philadelphia, Pa., assignor, by mesne assignments, to O. E. Szekely & Associates, Inc., Philadelphia, Pa., a corporation of Pennsylvania Application February 23, 1950, Serial No. 145,830

4 Claims. (Cl. 192—24)

This invention relates to a releasable driving connection adapted for use in making a positive driving connection between a prime mover and a member to be driven and so constructed as to permit quick release of the driving connection when desirable with insurance against reengagement. At the same time the device is so constructed that the driving connection can be readily reengaged.

In various installations where a member is positively driven by a prime mover, it becomes necessary to quickly release the driving connection without stopping or slowing down the prime mover. Thus, by way of example but without limitation, in aircraft a generator driven by the engine may develop a fault which requires the drive to be quickly released without disturbance of the functioning of the engine. And again, after the drive has been released it may be found that the supposed fault in the generator does not exist. In such case reengagement of the drive without disturbance of the functioning of the engine becomes desirable.

Now in accordance with this invention means in connection with the drive between a prime mover and a member to be driven which, normally inoperative, may be readily actuated to quickly release the drive and prevent its reengagement and which may be quickly reengaged, are provided. The means in accordance with this invention will be more particularly adaptable to a shaft drive and will be simple and economical to produce, of light weight, efficient in operation and will require a minimum of maintenance.

Having now indicated in a general way the nature and purpose of this invention, I will proceed, for illustrative purposes, to a detailed description of a preferred embodiment with reference to the accompanying drawings in which:

Figure 1 is a side view, partly in section and partly broken away, of an embodiment of this invention in connection with the drive between an engine and a generator.

Figure 2 is a sectional view showing detail of the embodiment shown in Figure 1.

Figure 3 is a plan view of an element of the embodiment shown in Figure 1.

Figure 4:
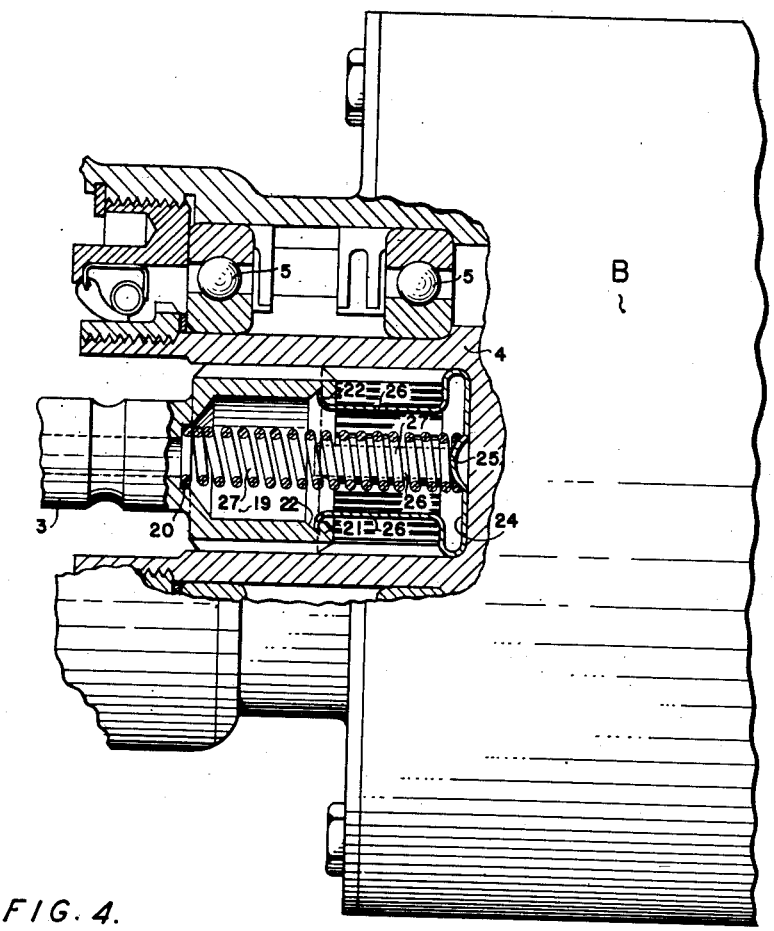
Figure 4 is a view, partly in section and partly broken away, showing details of construction of the embodiment shown in Figure 1.

Referring to Figures 1-4, A is a base of an engine, for example, an airplane engine, and B is, for example, a generator. The engine A is provided with a power take-off shaft 1 bored and splined for the reception of a splined end 2 of a connector shaft 3.

The generator B is provided with a shaft 4 bored and splined for the reception of a splined end of the connector shaft 3. The generator shaft 4 is mounted in bearings 5, 5 and the generator is provided with a mounting flange 6 through which it is secured to the engine by bolts or studs 6'.

The connector shaft 3 is provided, between its splined ends, with a thread 7 terminating at one end in a groove 8 of greater depth than that of the thread.

Between the generator flange 6 and the engine is positioned a spider 9, bored out for lightness and provided with a radial boss 10. The spider is bored from its periphery through the boss 10, a portion of the length of the bore 11 from the periphery being enlarged to form a shoulder 12.

Extending in the bore 11 is a plunger 13 having an annular flange 14 spaced from its lower end. A coil spring 15 surrounds the plunger 13 within the enlarged portion of the bore and bears against the flange 14 and an abutment 16 threaded into the bore from the periphery of the spider.

The plunger 13 is provided with a pin 17 at its upper end and is drilled for the reception of a removable cotter pin 28 at a point such that when the plunger 13 is retracted against the spring 15 to clear the thread 7 and the cotter pin passed through the bore, the cotter pin will rest on the outer end of abutment 16 and hold the plunger clear of the thread.

Figure 5:
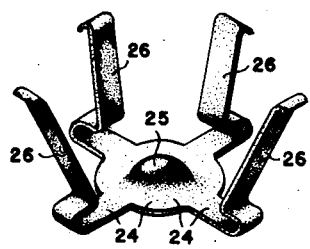
Figure 5 is a perspective view of a detail of constructure.

As shown in Figure 4, the end portion of the connector shaft 3, engaged with generator shaft 4, is bored out as indicated at 19, having a spring seat 20 formed at the bottom of the bore and grooved adjacent the open end of the bore to form a shoulder 21 having an outer curved face 22 and an angular surface 23, behind the shoulder 21. A spring, shown in detail in Figure 5, having a base 24, having a spring seat 25 formed centrally thereof and having spring arms 26 extending therefrom, is positioned in the bore in the end of the generator shaft with its base against the bottom of the bore and the ends of the spring arms engaged behind the shoulder 21 in the bore in the connector shaft 3.

A second spring 27 has its ends seated in the spring seat 29 at the bottom of the bore in the connector shaft and abut the seat 25 formed on the base 24, all as clearly shown in Figure 4.

The various elements above described, as shown in Figure 1, are so arranged that when the generator B is mounted on the engine A the start of the thread 7 on shaft 3 will, in the rotation of the shaft, pass opposite to the end of the plunger 13, which will be of a size slightly less than the width of the thread; and the annular flange on the plunger 13 will be spaced from the end of the plunger a distance such that on contact with the shoulder 12 the end of the plunger will be entered in the thread. The splines in the generator shaft 3 engaged therewith and the shaft 3 will be of a length such that its splined ends will, for driving connection, be engaged in the front end portions of the take-off and generator shafts, all as is shown and will be clear from an inspection of Figure 1.

Further, as is more particularly shown in Figure 4, the spring 27 will be under some tension and the spring arms 26 will be engaged behind the shoulder 22 in the bore 19 in the end of connector shaft 3 and will prevent axial movement of the connector shaft 3 into the bore in the power take-off shaft 1.

In operation, assuming the parts to be in the position shown in Figures 1 and 4, on operation of the engine the generator will be driven. If now it becomes necessary for any reason to quickly disconnect the generator from the power take-off shaft, the plunger 13 is lifted sufficiently, by grasping pin 17, to withdraw the cotter pin 28 and the plunger is then released and its lower end will enter the thread 7 under the influence of spring 15. Continued rotation of the connector shaft results in its being axially moved to withdraw it from engagement with the power take-off shaft. In this movement of the connector shaft 3, the spring 27 will be compressed and the ends of the spring arms 26 guided by the angular surface 23 will be released from shoulder 22 and extend into the bore in the connector shaft 3. When the connector shaft is released from the power take-off shaft, the plunger will drop into the groove 8 in the connector shaft and will act to hold the connector shaft in disconnected position against the action of spring 27.

If now it be found that the generator was ill-advisedly disconnected, or if for any other reason it be desired to reconnect it with the engine without stopping or interfering with the function of the engine, such will be accomplished by raising the plunger 13 by grasping the pin 17 and reinserting the cotter pin 28 to retain the plunger in raised position clear of the thread 7. When the plunger is raised out of the groove 8 and clear of the thread 7, the spring 27 will move the connector shaft 3 axially into engagement with the power take-off shaft 1 and, at the same time, the ends of spring arms 26 will engage the shoulder 22 and prevent further axial movement of the connector shaft. Thus, the generator will be reconnected with the power take-off shaft of the engine and the parts will be again in the position shown in Figures 1 and 4.

It will be noted that the thread 7 on connector shaft 3 is formed with a long lead so that the axial movement of the connector shaft, when pin 13 is engaged in the thread, will be large in order that the disengagement of the shaft 3 from the power take-off shaft 1 will be very rapid. By way of example, the lead of the thread 7 may be such as to effect axial movement of the shaft 3 sufficient to disconnect it from the power take-off shaft 1 in one or, at the most, two revolutions of the shaft 3.

Again, as a safeguard, the shaft 3 is weakened, as by the groove 18, between the thread 7 and the splined end of the shaft engaged with the generator shaft. The groove 18 provides a shear line on which the shaft 3 will shear off if the generator, for example, jams before the shaft 3 can be disengaged from the power take-off shaft by the plunger 13 and thread 7. The provision of the shear line, as groove 18, between the thread 7 and the generator enables the end of shaft 3 to be disengaged from the take-off shaft by the plunger 13 after shaft 3 has sheared for example, because of jamming of the generator.

Figure 6:
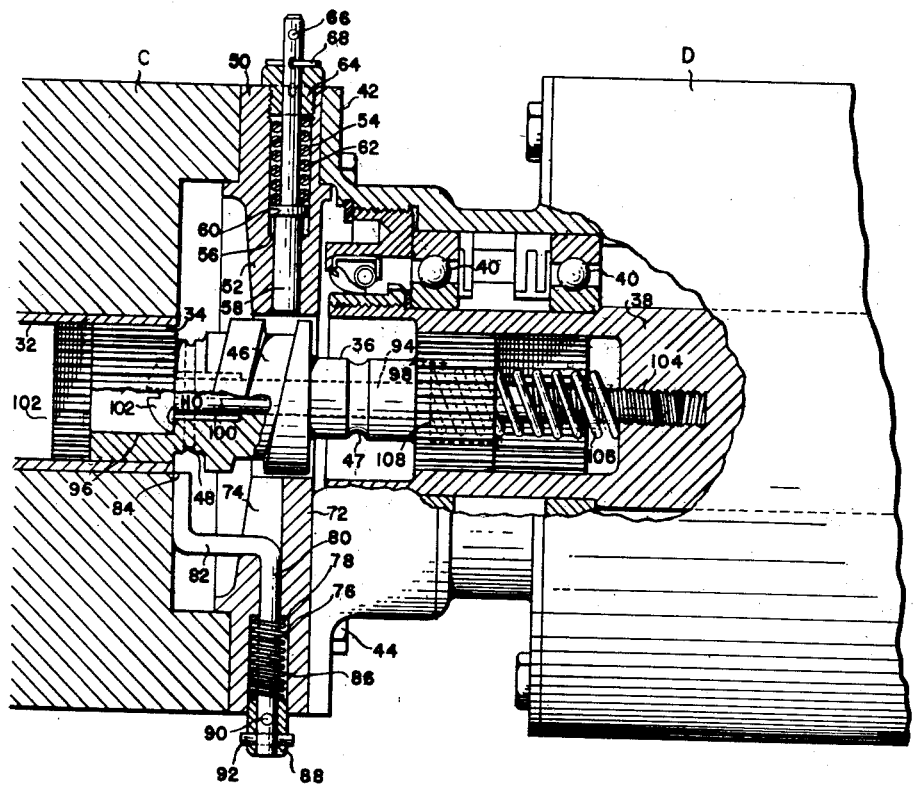
Figure 6 is a side view, partly in section and partly broken away, of another embodiment of this invention.

Referring now to Figure 6, C is a base of an engine, for example, an airplane engine, and D is, for example, a generator. Engine C has a power take-off shaft 32 which is bored and splined for the reception of a splined end 34 of a connector shaft 36.

The generator D is provided with a shaft 38 which is bored and splined for the reception of a splined end of the connector shaft 36. The generator shaft 38 is mounted in bearings 40, 40 and the generator is provided with a mounting flange 42 through which it is secured to the engine by bolts or studs 44.

The connector shaft 36 is provided, between its splined ends, with a thread 46. Thread 46 terminates at one end in a groove 48 which is of greater depth than that of the thread. In addition, the connector shaft has a weakened portion 47 which will break should the withdrawal mechanism fail to operate in time.

Between the generator flange 42 and engine C is positioned a spider 50 having a boss 52. Boss 52 is bored radially to provide a bore 54, the upper portion of which is larger than the lower portion, to form a shoulder 56.

Extending in the bore 54 is a plunger 58 having an annular flange 60 spaced from its lower end. A coil spring 62 surrounds plunger 58 within the enlarged portion of the bore and bears against flange 60 and an abutment 64 threaded into the bore from the periphery of the spider.

Plunger 58 has a pin 66 at its upper end and is drilled for the reception of a removable cotter pin 68 at a point such that when the plunger 58 is retracted against spring 62 to clear thread 46 and the cotter pin passed through the bore, the cotter pin will rest on the outer end of abutment 64 and hold the plunger clear of the thread.

A second boss 72 is provided with a radial slot 74. A bore 76 connects the periphery of the spider with the slot. Bore 76 has an enlarged outer portion forming a shoulder 78. A plunger 80 has an offset portion 82 which is adapted to travel in slot 74 and prevent the plunger 80 from rotating and a feeler end 84.

A spring 86 encompasses a portion of plunger 80 in the enlarged part of bore 76. Spring 86 abuts against shoulder 78 and against a cap 88 secured to plunger 80 by means of a pin 90. Cap 88 has a pin 92 which acts to limit the inward travel of plunger 80.

It will be noted that when the connector shaft 36 is positioned as shown in Figure 6, that is, in the normal driving position, the feeler end 84 of plunger 80 is so positioned with respect to groove 48 that the inward movement of plunger 80 will result in feeler end 84 freely entering groove 48.

The connector shaft 36 has a hollow bore 94 which has at opposite ends enlarged portions 96 and 98 respectively. A bolt 100 having a head 102 passes freely through bore 94 and is threadably secured to shaft 38 as shown at 104.

A coil spring 106 encompasses bolt 100 and abuts against shoulder 108 in the connector shaft and against shaft 38. As we observe Figure 6, spring 106 acts to bias connector shaft 36 to the left and forces shoulder 110 in connector shaft 36 against bolt head 102. Thus, spring 106 together with bolt head 102 and shoulder 110 act to fix the axial position of connector shaft 36 in an accurate manner. It will be apparent that a fine adjustment of this position may be accomplished by turning the bolt 100 either further into or out of shaft 38 depending upon which direction it is desired to move shaft 36.

On operation of the engine, assuming the parts to be in the positions shown in Figure 6, the generator will be driven. Should it be necessary to quickly disconnect the generator from the power take-off shaft, plunger 58 is lifted by pin 66, cotter pin 68 is withdrawn, the plunger is released and enters thread 46 under the influence of spring 62. The rotation of the connector shaft 36 results in its being axially moved to withdraw it from engagement with shaft 32. When connector shaft 36 is released from shaft 32, plunger 58 drops into groove 48 and will act to hold the connector shaft in disconnected position against the action of spring 106.

In order to return connector shaft 36 to its proper engaged position with shaft 32, it is simply necessary to withdraw plunger 58 by means of pin 66 and replace cotter pin 68 to hold it in the withdrawn position. Spring 106 will then force connector shaft 36 to the left, as we view Figure 6, into engagement with shaft 32, forcing shoulder 110 into abutting relation with bolt head 102. Thus, the generator will be reconnected with the power take-off shaft of the engine and the parts will be again in the position shown in Figure 6.

Feeler end 84 is provided to determine whether or not the connector shaft 36 is located in the proper driving position. When the connector shaft 36 is in the fully withdrawn position, that is, with plunger 58 seated in groove 48, it will be noted that feeler end 84 of plunger 80 will come into contact with the end of connector shaft 36, thus preventing the plunger from being depressed until pin 92 touches the outer periphery of spider 50. The only time that plunger 80 can be depressed until pin 92 touches the periphery of spider 50 is when the connector shaft 36 is in proper driving position at which time groove 48 lies in the same axial plane as the feeler end of plunger 80, thus permitting the feeler end to move inwardly unobstructed.

Figure 7:
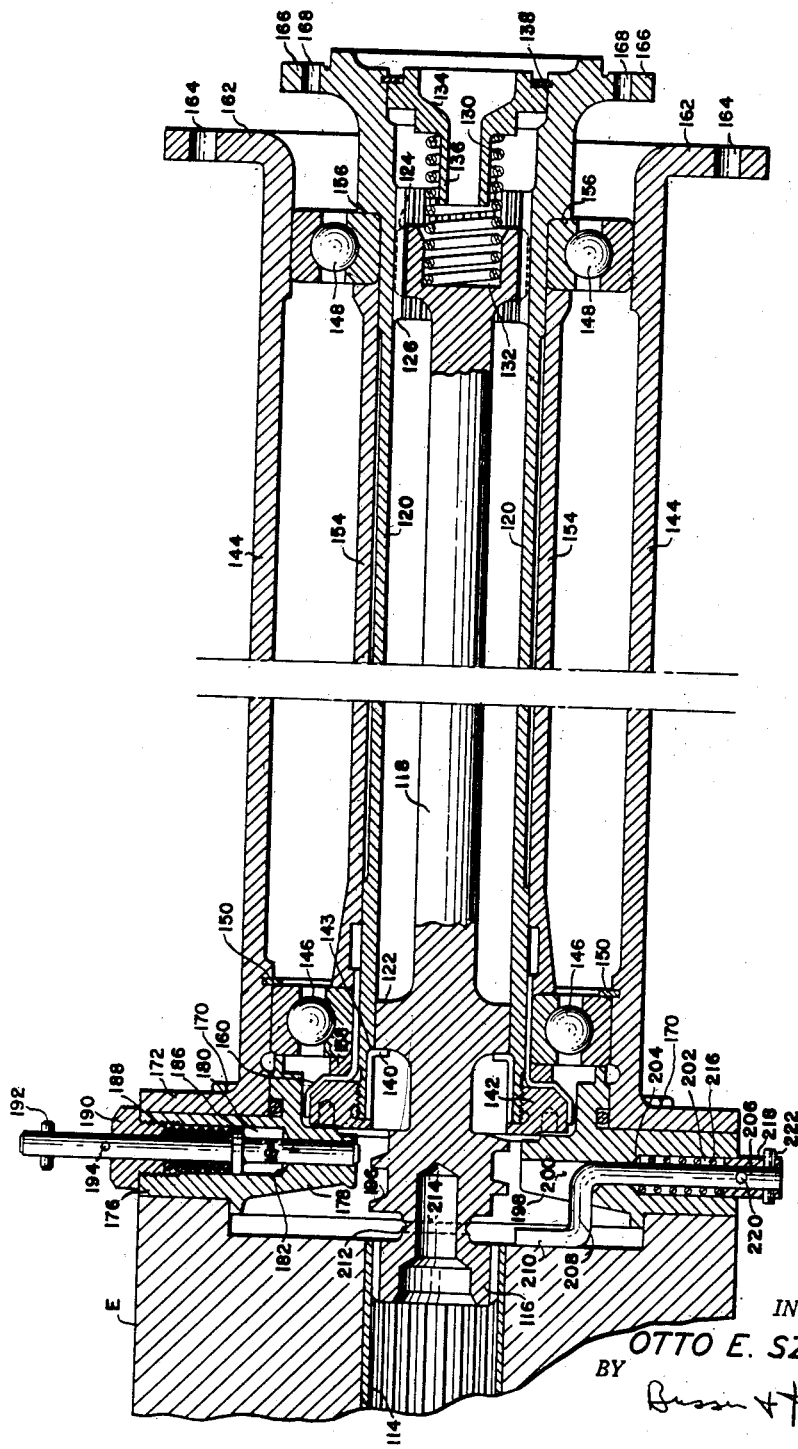
Figure 7 is a sectional view, partly broken away, showing another embodiment of this invention which is particularly adapted for use in connection with a remote accessory.

Referring now to Figure 7, the embodiment shown here is particularly adapted for use where, for example, a generator is positioned somewhat remotely from the engine. As shown, an engine base E has a power take-off shaft 114. Shaft 114 is bored and splined for the reception of a splined end 116 of a connector shaft 118.

Shaft 118 is carried throughout the greater portion of its extent within hollow shaft 120. A collar 122 on shaft 118 abuts against the inner surface of hollow shaft 120 and acts to center shaft 118 within shaft 120.

The end of shaft 118 which is remote from engine E carries splines 124 which are adapted to engage splines 126 secured to the inside of shaft 120.

A coil spring 130 is carried out in hollowed out portion 132 in shaft 118 and abuts against a spring retainer 134. Spring retainer 134 has a spindle 136 which is encompassed by spring 130 and is held in position by a snap ring as shown at 138.

As seen in Figure 7, spring 130 biases shaft 118 to the left against a stop 140 which is adapted to abut against collar 122 and which is retained in place by means of a nut 142 threaded onto shaft 120 and holding stop 140 against shoulder 143.

A tubular housing 144 carries shaft 120 through the medium of bearings 146 and 148. Bearings 146 and 148 are held against axial movement inwardly by a tubular bearing spacer 154, bearing 146 being additionally held by snap ring 150. The exterior side of bearing 148 abuts against a shoulder 156 on shaft 120. The exterior side of bearing 146 abuts against a bearing spacer 158 which in turn abuts against a lock washer sleeve 160 which is held in position by means of nut 142.

Housing 144 is provided with a flange 162 having bolt holes 164 by means of which housing 144 can be bolted to an accessory (not shown) such as, for example, a generator. Hollow shaft 120 has a flange 166 which is provided with bolt holes 168 by means of which the shaft 120 can be bolted to the drive shaft of the accessory. The engine end of housing 144 is secured to the engine base E by means of bolts 170 which pass through flange 172.

Between the engine E and flange 172 is positioned a spider 176. The spider has a radial boss 178 which, in turn, is provided with a radial bore 180. A portion of the length of the bore 180 from the periphery is enlarged to form a shoulder 182.

Extending in the bore 180 is a plunger 184 having an annular flange 186 spaced from its lower end. A coil spring 188 surrounds plunger 184 within the enlarged portion of the bore and bears against flange 186 and an abutment 190 threaded into the bore through the periphery of the spider.

Plunger 184 is provided with a pin 192 at its upper end and is drilled for the reception of a removable cotter pin 194 at a point such that when the plunger 184 is retracted against spring 188, the cotter pin, passed through the bore, will rest on the outer end of abutment 190 and will hold plunger 184 clear of a thread 196 on the shaft 118.

Spider 176 has a second boss 198 which is provided with a radial slot 200 near its inner periphery and with a bore 202 connecting the slot to the outer periphery of the spider. Bore 202 has an enlarged outer portion to form a shoulder 204.

A crank-shaped plunger 206 is carried in slot 200 and bore 202. Plunger 206 has a right-angled portion 208 which, together with slot 200, prevents the plunger from turning. Plunger 206 has a feeler end 210 which is adapted to be depressed into a groove 212 in shaft 118. It will be noted that groove 212 is adjacent one end of thread 196 and is deeper than the thread. It will be further noted that the center of groove 212 is further grooved to provide a weakened sheer section 214 in shaft 118.

The enlarged portion of bore 202 carries a spring 216 which encompasses plunger 206 and abuts against shoulder 204 and plunger cap 218 which is secured to the plunger by means of a pin 220. A second pin 222 which passes through cap 218 and plunger 206 limits the inward travel of plunger 206.

In operation, assuming the parts to be in the positions shown in Figure 7, on operation of the engine, shaft 118 and shaft 120 will be driven and, in turn, will drive the accessory to which shaft 120 is connected. In order to disconnect the accessory from its driving relationship with the engine, cotter pin 194 is withdrawn and plunger 184 is depressed by means of spring 188 until its lower end enters thread 196. Continued rotation of shaft 118 results in its being axially moved to withdraw it from engagement with power take-off shaft 114. When shaft 118 is released from its connection with shaft 114, plunger 184 drops into groove 212 and holds shaft 118 in the disengaged position against the action of spring 130, which has been compressed by the axial movement of shaft 118.

If, now, for any reason, it is desired to reconnect shaft 118 to shaft 114, this can readily be accomplished by raising plunger 184 until it is clear of thread 196. The plunger may be secured in this position by reinserting cotter pin 194. Plunger 184 being clear of thread 196, spring 130 moves shaft 118 axially until it is reengaged with shaft 114 and collar 122 abuts against stop 140.

As previously noted, shaft 118 is provided with a grooved sheer section 214 in the event that, for example, the accessory jams before shaft 118 can be disengaged from shaft 114. In the event that the sheer section is severed, collar 122 will act to keep shaft 118 centered within hollow shaft 120.

Plunger 206 operates in the same manner as the plunger 80 of Figure 6 to indicate whether or not shaft 118 is in the proper engaged or driving position. If such is the case, it will be apparent that when plunger 206 is depressed, feeler end 210 will be aligned with groove 212 and can enter the groove permitting a full depression of plunger 206. If, on the other hand, shaft 118 is disengaged from shaft 114 or is not wholly engaged therewith, when plunger 206 is depressed, feeler end 210 will abut against the splines on end 116 of shaft 118 and, therefore, prevent the plunger 206 from being depressed the full amount, thus indicating that shaft 118 is not properly engaged or is disengaged with shaft 114.

It will be appreciated that the embodiments of this invention as described above for illustrative purposes may be variously adapted for uses other than described by way of example and may be variously modified in detail without departing from this invention. Applicant, therefore, does not desire to be limited except as set forth in the appended claims.

This is a continuation in part of my application Serial No. 66,963, filed December 23, 1948, now abandoned.

What is claimed is:

1. A releasable drive for connecting a driving member and a driven member comprising a connector shaft having splined end portions, a driving shaft bored and splined for the reception of one end of said connector shaft, a driven shaft bored and splined for the reception of the other end of said connector shaft, a thread formed on said connector shaft, a plunger mounted for movement radially of said connector shaft and adapted for entry into said thread to effect axial movement of said shaft in its rotation and a spring in the bore of the driven shaft which abuts against the connector shaft and which biases the connector shaft towards the driving shaft, stop means to limit the travel of the connector shaft responsive to the spring, a circumferential groove in said connector shaft, a second plunger mounted for radial movement with respect to said connector shaft, said groove being positioned on said connector shaft so as to lie in the same radial plane with the end of said second plunger when the connector shaft is properly engaged with said driving shaft and a portion of the connector shaft lying opposite said second plunger when the connector shaft is disengaged from said driving shaft.

2. A releasable drive for connecting a driving member and a remote driven member comprising a connector shaft having a splined in-put end and a splined out-put end, a driving shaft bored and splined for the reception of the splined in-put end of said connector shaft, a casing, a hollow shaft mounted for rotation in said casing and encompassing the major portion of said connector shaft, said hollow shaft having an attachment end adapted to be secured to a shaft to be driven and being splined adjacent said end for the reception of the splined out-put end of the connector shaft, a collar on the connector shaft which is in contact with the interior surface of the hollow shaft and which is remote from the out-put end of the connector shaft, a spring mounted in the attachment end of the hollow shaft and abutting against the connector shaft so as to urge the connector shaft into engagement with the driving shaft, stop means to limit the travel of the connector shaft in response to said spring, a thread formed on said connector shaft and a plunger mounted independently and movable radially of said connector shaft and adapted for entry into said thread to effect axial movement of said connector shaft in its rotation.

3. A releasable drive for connecting a driving member and a remote driven member comprising a connector shaft having a splined in-put end and a splined out-put end, a driving shaft bored and splined for the reception of the splined in-put end of said connector shaft, a casing, a hollow shaft mounted for rotation in said casing and encompassing the major portion of said connector shaft, said hollow shaft having an attachment end adapted to be secured to a shaft to be driven and being splined adjacent said end for the reception of the splined out-put end of the connector shaft, a collar on the connector shaft which is in contact with the interior surface of the hollow shaft and which is remote from the out-put end of the connector shaft, a spring mounted in the attachment end of the hollow shaft and abutting against the connector shaft so as to urge the connector shaft into engagement with the driving shaft, stop means to limit the travel of the connector shaft in response to said spring, a thread formed on said connector shaft, a plunger mounted independently and movable radially of said connector shaft and adapted for entry into said thread to effect axial movement of said connector shaft in its rotation, a circumferential groove in said connector shaft, a second plunger mounted for radial movement with respect to said connector shaft, said groove being positioned on said connector shaft so as to lie in the same radial plane with the end of said second plunger when the connector shaft is properly engaged with said driving shaft and a portion of the connector shaft lying opposite said second plunger when the connector shaft is disengaged from said driving shaft.

4. A releasable drive for connecting a driving member and a remote driven member comprising a connector shaft having a splined in-put end and a splined out-put end, a driving shaft bored and splined for the reception of the splined in-put end of said connector shaft, a casing, a hollow shaft mounted for rotation in said casing and encompassing the major portion of said connector shaft, said hollow shaft having an attachment end adapted to be secured to a shaft to be driven and being splined adjacent said end for the reception of the splined out-put end of the connector shaft, a collar on the connector shaft which is in contact with the interior surface of the hollow shaft and which is remote from the out-put end of the connector shaft, a spring mounted in the attachment end of the hollow shaft and abutting against the connector shaft so as to urge the connector shaft into engagement with the driving shaft, stop means to limit the travel of the connector shaft in response to said spring, a thread formed on said connector shaft and a plunger mounted independently and movable radially of said connector shaft and adapted for entry into said thread to effect axial movement of said connector shaft in its rotation.

OTTO E. SZEKELY.

References Cited in the file of this patent

UNITED STATES PATENTS

| Number | Name | Date |
|---|---|---|
| 845,113 | Noren | Feb. 26, 1907 |
| 876,053 | Heard | Jan. 7, 1908 |
| 1,188,790 | Kelley | June 27, 1916 |
| 1,193,008 | Fuller | Aug. 1, 1916 |
| 1,314,260 | Gindrat | Aug. 26, 1919 |
| 1,511,651 | Brake | Oct. 14, 1924 |
| 1,974,581 | Olander | Sept. 25, 1934 |
| 2,379,775 | Young | July 3, 1945 |
| 2,509,813 | Dineen | May 30, 1950 |